United States Patent
David et al.

(10) Patent No.: US 11,901,594 B2
(45) Date of Patent: Feb. 13, 2024

(54) METHOD FOR OPERATING A FUEL CELL VEHICLE IN THE IDLING MODE

(71) Applicant: Bayerische Motoren Werke Aktiengesellschaft, Munich (DE)

(72) Inventors: Frank David, Garching (DE); Juergen Thyroff, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 544 days.

(21) Appl. No.: 16/774,987

(22) Filed: Jan. 28, 2020

(65) Prior Publication Data
US 2020/0161680 A1    May 21, 2020

Related U.S. Application Data

(63) Continuation of application No. PCT/EP2018/070875, filed on Aug. 1, 2018.

(30) Foreign Application Priority Data

Aug. 2, 2017 (DE) ...................... 10 2017 213 437.2

(51) Int. Cl.
*H01M 8/04302* (2016.01)
*H01M 8/04225* (2016.01)
(Continued)

(52) U.S. Cl.
CPC ......... *H01M 8/04302* (2016.02); *B60L 58/13* (2019.02); *B60L 58/31* (2019.02);
(Continued)

(58) Field of Classification Search
None
See application file for complete search history.

(56) References Cited

U.S. PATENT DOCUMENTS

2002/0162694 A1* 11/2002 Iwasaki ................. B60L 58/15
                                                                  429/430
2003/0211021 A1    11/2003 Oi et al.
(Continued)

FOREIGN PATENT DOCUMENTS

CN         1388781 A      1/2003
DE    101 31 320 A1      1/2003
(Continued)

OTHER PUBLICATIONS

PCT/EP2018/070875, International Search Report dated Nov. 7, 2018 (Two (2) pages).
(Continued)

*Primary Examiner* — Todd Melton
*Assistant Examiner* — Jason R Roberson
(74) *Attorney, Agent, or Firm* — Crowell & Moring LLP

(57) ABSTRACT

A method for operating a motor vehicle includes the steps of registering a maximum dynamics requirement and adapting the idling operating mode of a fuel cell system of the motor vehicle on the basis of the maximum dynamics requirement. In the first maximum dynamics requirement, lower dynamics are required than in the second maximum dynamics requirement. In the first maximum dynamics requirement, the fuel cell system is operated in a first idling operating mode. In the second maximum dynamics requirement the fuel cell system is operated in a second idling operating mode. The fuel cell system is operated more efficiently in the first idling operating mode than in the second idling operating mode.

10 Claims, 1 Drawing Sheet

(51) Int. Cl.
*B60L 58/31* (2019.01)
*B60L 58/13* (2019.01)

(52) U.S. Cl.
CPC ..... *H01M 8/04225* (2016.02); *B60L 2240/68* (2013.01); *B60L 2250/18* (2013.01); *B60L 2260/26* (2013.01); *B60L 2260/54* (2013.01); *H01M 2250/20* (2013.01)

(56) References Cited

U.S. PATENT DOCUMENTS

| | | | |
|---|---|---|---|
| 2005/0197751 A1* | 9/2005 | Koike | H01M 16/006 180/65.265 |
| 2013/0335000 A1 | 12/2013 | Maier | |
| 2014/0170514 A1 | 6/2014 | Harris et al. | |
| 2014/0277931 A1* | 9/2014 | Crowe | B60L 58/31 701/36 |
| 2017/0263956 A1* | 9/2017 | Weß | H01M 16/006 |
| 2018/0097245 A1* | 4/2018 | Matsusue | H01M 8/10 |

FOREIGN PATENT DOCUMENTS

| | | |
|---|---|---|
| DE | 10 2013 207 244 A1 | 10/2013 |
| KR | 10-2013-0055889 A | 5/2013 |

OTHER PUBLICATIONS

German Search Report issued in German counterpart application No. 10 2017 213 437.2 dated Jul. 18, 2018, with Statement of Relevancy (Seven (7) pages).

Chinese Office Action issued in Chinese application No. 201880045373.7 dated Aug. 12, 2022, with English translation (Fourteen (14) pages).

* cited by examiner

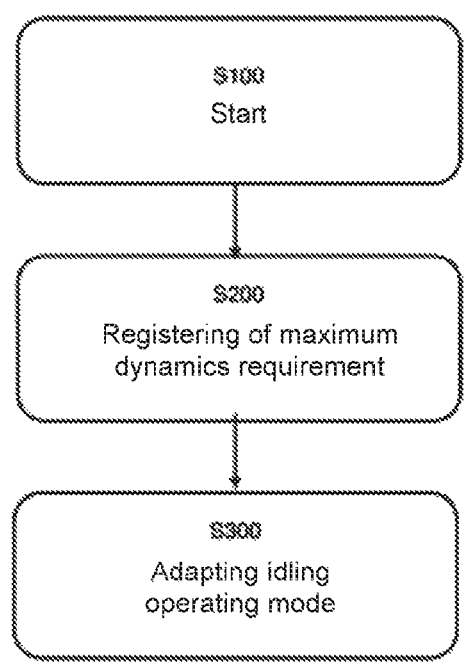

METHOD FOR OPERATING A FUEL CELL VEHICLE IN THE IDLING MODE

CROSS REFERENCE TO RELATED APPLICATIONS

This application is a continuation of PCT International Application No. PCT/EP2018/070875, filed Aug. 1, 2018, which claims priority under 35 U.S.C. § 119 from German Patent Application No. 10 2017 213 437.2, filed Aug. 2, 2017, the entire disclosures of which are herein expressly incorporated by reference.

BACKGROUND AND SUMMARY OF THE INVENTION

The technology disclosed here relates to a method for operating a motor vehicle in the idling mode. In addition, the technology disclosed here relates to a fuel cell system which is configured to carry out the method disclosed here. Motor vehicles which are operated by fuel cells are known per se. It is known that high electrical voltages reduce the service life of fuel cells. Therefore, a certain minimum decrease in power even when there is no demand for power (="idling") is desired. Furthermore, previously known motor vehicles generally have a high-voltage battery. The electrical power for the propulsion of the motor vehicle is generally made available by fuel cell systems and by the high voltage battery. In this context, there are situations in which the fuel cell system is switched off in order to save energy. However, this has a negative effect on the driving dynamics since a certain start-up time passes before the fuel cell system can make available the full power again. There is a need to make the highest possible driving dynamics, with the lowest possible consumption, possible for the driver.

A preferred object of the technology disclosed here is to reduce or overcome at least one disadvantage of a previously known solution or to propose an alternative solution. It is, in particular, a preferred object of the technology disclosed here to keep the consumption low at the same time and in addition make available good (preferably maximum) driving dynamics. Further preferred objects can arise from the advantageous effects of the technology disclosed here.

BRIEF DESCRIPTION OF THE DRAWING

The FIGURE illustrates a method of the present invention.

DETAILED DESCRIPTION OF THE INVENTION

The technology disclosed here relates to a method for operating a motor vehicle. The method comprises the steps:
 direct or indirect registering of a maximum dynamics requirement or of a dynamics limitation; and
 adapting the idling operating mode of a fuel cell system of the motor vehicle on the basis of the dynamics requirement.

The maximum dynamics requirement or the dynamics limitation is here
i) the maximum power dynamics which currently are possible or will be possible on the basis of the traffic situation; and/or
ii) the maximum power dynamics which are desired by the driver.

In other words, it is registered directly or indirectly what maximum power change rates can occur during operation on the basis of the traffic situation and/or on the basis of a driver's request. The term "maximum dynamics requirement" or "dynamics requirement" is used below for the sake of simplification.

The idling operating mode is the mode in which the fuel cell system makes available no electrical energy for the driving operation to the at least one electric drive motor. There can be provision that in the second idling operating mode disclosed here, electrical energy which is made available by the fuel cell system is converted into reactive power by suitable actuation of the drive motor. This may be appropriate in order to reduce the no-load voltages, in particular if the energy storage device has exceeded an upper state of charge limiting value. Likewise, in the second idling mode there may be provision that other secondary consumers do not consume energy which can be stored in the energy storage device, in order to reduce the no-load voltages in this way.

According to the technology disclosed here, in the case of a first maximum dynamics requirement lower dynamics are required than in the case of a maximum second dynamics requirement. In the case of the first dynamics requirement the fuel cell system is operated in a first idling operating mode. In addition, in the case of the second dynamics requirement the fuel cell system is operated in a second idling operating mode. According to the technology disclosed here, the fuel cell system is operated more efficiently in the first idling operating mode than in the second idling operating mode.

The registering of the maximum dynamics requirement can comprise the step according to which the traffic situation is registered.

The method can also comprise the step according to which the dynamics requirement to be registered is a future dynamics requirement. In particular, the traffic situation to be registered can be a future traffic situation. In other words according to the technology disclosed here not only real actual values are registered but it is also possible alternatively or additionally to predict future maximum dynamics requirements, for example by determining a future traffic situation and predicting the future maximum dynamics requirement on the basis thereof.

The traffic situation can particularly preferably be registered by the surroundings detection system of the motor vehicle. The surroundings detection system advantageously comprises here one or more of the following components: ultrasonic sensor, radar sensor, lidar device and/or camera device.

However, it is also possible for any other system which is configured to register the surroundings of the motor vehicle to be used. However, it is also possible for any other system which is configured to register the surroundings of the motor vehicle to be used According to the technology disclosed here, the maximum dynamics requirement and/or the traffic situation are registered on the basis of at least one piece of information, wherein the information is made available by at least one vehicle-external computing unit. Data transmitted in a wireless fashion can be made available by a computing unit which is external with respect to the motor vehicle and which evaluates the position of the motor vehicle and that of other objects and places them in relation to one another. This can be done, for example, by means of a traffic control system and/or car-to-car communication.

The method disclosed here can comprise the step according to which the maximum dynamics requirement is limited by a driver input. The driver input can be implemented, for example, by means of the preselection of a driving mode or operating mode. An operating mode or driving mode which is chosen by a driver of the vehicle can be selected from a multiplicity of operating modes or driving modes.

The multiplicity of operating modes can comprise, for example, a first mode (e.g., an eco mode or comfort mode) which is directed to a comfortable and/or energy-efficient driving behavior of the vehicle. In such a mode, the driver accepts or desires a driving dynamic which can be limited to the second maximum dynamics requirement in the idling operating mode.

In the first idling mode there can be provision that at least one electrical consumer of the fuel cell system is switched off or is in a switched-off state. For example, the at least one electrical consumer can be the oxidizing agent feeder, the coolant pump and/or the fuel recirculation feeder.

Moreover, the multiplicity of operating modes can comprise a second mode (e.g., a sport mode) which is directed to a dynamic driving behavior of the vehicle. In such a second mode, the driver desires driving dynamics which can be limited to the second maximum dynamics requirement in the idling operating mode. Consequently, relatively high dynamics requirements therefore have to be satisfied.

In the second idling operating mode, the operation of the fuel cell system can be tailored specifically to the fact that it can start up again particularly quickly. For example, the oxidizing agent feeder can be operated at higher idling rotational speeds than in the first operating mode. In a cathode-side bypass to the fuel cell stack it is then preferably possible to conduct more oxidizing agent past the fuel cell stack. This has the advantage that the fuel cell system can be started up again particularly quickly.

The pre-selection of a driving mode or operating mode can be carried out, for example, by means of a (driving experience) switch and/or can be set by an occupant of the vehicle by means of a menu of a menu-driven user interface of the vehicle.

In particular, in the first idling operating mode the fuel cell system can be operated more efficiently
i) in that the fuel cell system is operated at a more efficient operating point (e.g., the oxidizing agent feeder can be operated at a lower rotational speed); and/or
ii) in that at least one secondary consumer of the fuel cell system is switched off in the first idling operating mode and therefore do not consume any electrical energy.

With the technology disclosed here, the efficiency of the fuel cell system is increased without at the same time the driving dynamics which are perceived by the driver being degraded, and this is because the traffic situation only permits driving dynamics which can also be made available in the first idling operating mode. Nevertheless, the second idling operating mode permits a dynamic driving style.

The technology disclosed here can also comprise the step according to which the state of charge of the at least one energy storage device is registered. The fuel cell system can supply the energy storage device with electrical energy if the state of charge (SoC) is below a lower state of charge limiting value.

The technology disclosed here relates to a fuel cell system having at least one fuel cell. The fuel cell system is configured to carry out the methods disclosed here. The fuel cell system is intended, for example, for mobile applications such as motor vehicles (e.g., passenger cars, motorbikes, utility vehicles), in particular for making available the energy for at least one driving machine for propelling the motor vehicle. In its simplest form, a fuel cell is an electrochemical energy converter which converts fuel and oxidizing agent into reaction products and in the process produces electricity and heat. The fuel cell comprises an anode and a cathode which are separated by an ion-selective or ion-permeable separator. The anode is supplied with fuel. Preferred fuels are: hydrogen, low-molecular alcohol, biofuels or liquefied natural gas. The cathode is supplied with oxidizing agent. Preferred oxidizing agents are, for example, air, oxygen and peroxide. The ion-selective separator can be embodied, for example, as a proton exchange membrane (PEM). A plurality of fuel cells are generally combined to form one fuel cell stack or stack.

The fuel cell system comprises an anode subsystem which is formed by the fuel-conducting components of the fuel cell system. An anode subsystem can have at least one pressure container, at least one tank shut-off valve (=TAV), at least one pressure reducer, at least one anode flow path which leads to the anode inlet of the fuel cell stack, an anode space in the fuel cell stack, at least one recirculation flow path leading away from the anode outlet of the fuel cell stack, at least one water separator (=AWS), at least one anode flush valve (=APV), at least one active or passive fuel recirculation feeder (=ARE or ARB) as well as further elements. The main objective of the anode subsystem is to supply and distribute fuel to the electrochemically active surfaces of the anode space and to carry away anode off-gas. The fuel cell system comprises a cathode subsystem. The cathode subsystem is formed from the oxidizing-agent components. A cathode subsystem can have at least one cathode inflow path leading to the cathode, at least one cathode off-gas path leading away from the cathode outlet, a cathode space in the fuel cell stack and further elements. The main function of the cathode subsystem is to supply and distribute oxidizing agent to the electrochemically active faces of the cathode space and to carry away and consumed oxidizing agent.

The fuel cell system which is disclosed here comprises at least one cooling circuit which is configured to control the temperature of the fuel cell stack of the fuel cell system. The cooling circuit expediently comprises at least one heat exchanger, at least one cooling agent feeder and at least one fuel cell.

The system disclosed here comprises at least one oxidizing agent feeder. The oxidizing agent feeder is configured to feed the oxidizing agent involved in the electrochemical reaction to the at least one fuel cell. The oxidizing agent feeder (also referred to as fluid feeder device) can be embodied as a compressor, particularly preferably as a turbo compressor or centrifugal compressor with air bearing.

The anode subsystem generally comprises at least one fuel recirculation feeder for feeding fuel into the anode inflow path. The recirculation feeder is expediently arranged in the recirculation flow path. The recirculation feeder is, in particular, not formed by a jet pump.

An energy storage device is a device for storage of electrical energy. For example, the energy storage device can be a high voltage accumulator. The energy storage device can expediently be embodied as a battery, in particular as a high voltage battery. Alternatively or additionally, supercapacitors (known for short as supercaps or SC) can also serve as an energy storage device.

The at least one electric drive motor can be an electric motor which contributes to propelling the motor vehicle. The drive motor is preferably an electric motor which can feed back electrical energy to the energy storage device by recuperation. The motor vehicle disclosed here can likewise comprise a plurality of electric drive motors. It would be assumed that with respect to the technology disclosed here the term "at least one drive motor" also includes designs with "one drive motor" or with "a plurality of drive motors".

The system disclosed here also comprises at least one control unit. The control unit is configured inter alia to carry out the method steps disclosed here. For this purpose, the control unit can at least partially and preferably completely perform closed-loop control or open-loop control of the actuators of the system on the basis of signals which are made available.

In other words, the technology disclosed here relates to a method in which different idling modes are provided depending on the assessment of the traffic situation which is detected, wherein the efficiency of the idling mode is optimized in accordance with the required start-up time. In one design, a differentiation is made between two idling modes: a) the control generates a first signal which is indicative of "high power dynamics not possible or not desired" (=first idling operating mode).

This signal is formed from a combination or the combination of the following information sources or sensors:
- assessment of the traffic situation by camera (congestion, red traffic light, closed railway crossing, vehicle operation on a ferry, loading onto a railway, underground garage, etc.);
- distance sensors;
- distance radar;
- current vehicle position by means of GPS data and/or in conjunction with traffic disruption messages;
- driver's request by the pressing of a button;
- current velocity; and/or
- state of roadway (low coefficients of friction owing to icing up etc.);
- at a low filling level of the pressure container (reserve) etc.

If the first signal under a) is logically true (condition "high power dynamics not possible or not desired" is satisfied), an "idling mode with maximum energy efficiency" at the expense of the start-up time/start-up dynamics is selected/permitted. If the first signal under y) is logically false (condition "high power dynamics not possible or not desired" is not satisfied), just one conventional idling mode is then permitted.

If the "idling mode with maximum energy efficiency" (=first idling operating mode) is triggered, the secondary assembly such as, for example, the compressor, but also coolant pumps, the recirculation pump etc. can be shut off completely. The energy efficiency of the idling is then optimized in accordance with the detected maximum possible dynamics requirement, without restrictions being perceptible by the driver. A further refinement in more stages is conceivable—depending on the start-up time requirement and the energy saving which can be implemented.

The energy consumption during idling can be reduced with the technology disclosed here. Furthermore, the stack degradation can be reduced by means of higher stack voltages. In addition, the noise emissions at a low velocity can advantageously be reduced in accordance with the detected traffic situation. Depending on the overall drive configuration and the driving power requirement it is possible to reduce the high voltage battery capacity, which gives rise to low production costs.

The technology disclosed here will now be explained with reference to the schematic FIGURE. The method starts with step S100. In step S200 the maximum dynamics requirement is registered. In step S300 the idling operating mode of the fuel cell system of the motor vehicle is adapted on the basis of the maximum dynamics requirement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a motor vehicle, comprising the acts of:
   determining a maximum dynamics requirement for the motor vehicle coming out of an idling mode in which a fuel cell system of the motor vehicle does not provide electricity for a driving operation of the motor vehicle to an electric engine, wherein the maximum dynamics requirement corresponds to a maximum power change rate required during operation coming out of the idling mode, wherein the maximum dynamics requirement is determined from among a first maximum dynamics requirement and a second maximum dynamics requirement, wherein lower maximum power change rates are required for the first maximum dynamics requirement than for the second maximum dynamics requirement; and
   adapting operation of a fuel cell system of the motor vehicle, during the idling mode, based on the maximum dynamics requirement, such that: (a) when the maximum dynamics requirement is the first maximum dynamics requirement, the fuel cell system is adapted to operate in a first idling operation mode, and (b) when the maximum dynamics requirement is the second maximum dynamics requirement, the fuel cell system is adapted to operate in a second idling operation mode, wherein the fuel cell system is operated more efficiently in the first idling operation mode than in the second idling operation mode.

2. The method according to claim 1, wherein the maximum dynamics requirement is based on a traffic situation.

3. The method according to claim 1, wherein the maximum dynamics requirement is a future maximum dynamics requirement and/or is based on a future traffic situation.

4. The method according to claim 2, wherein the traffic situation is determined by a surroundings detection system of the motor vehicle.

5. The method according to claim 1, wherein the maximum dynamics requirement is registered on a basis of a piece of information and wherein the piece of information is made available by a vehicle-external computing unit.

6. The method according to claim 1, wherein the maximum dynamics requirement is limited by a driver input.

7. The method according to claim 1, wherein in the first idling mode an electrical consumer of the fuel cell system is switched off or is in a switched-off state.

8. The method according to claim 7, wherein the electrical consumer is an oxidizing agent feeder, a coolant pump, or a fuel recirculation feeder.

9. The method according to claim 1 further comprising the act of registering a state of charge of an energy storage device wherein the fuel cell system supplies the energy storage device with electrical energy if the state of charge is below a lower state of charge limiting value.

10. A fuel cell system, comprising:

one or more fuel cell system components, including at least one of: a cathode subsystem, an anode subsystem, a cooling circuit, an oxidizing agent feeder, and a fuel recirculation feeder; and a controller configured to actuate the one or more fuel cell system components so as to:

determine a maximum dynamics requirement for the motor vehicle coming out of an idling mode in which a fuel cell system of the motor vehicle does not provide electricity for a driving operation of the motor vehicle to an electric engine, wherein the maximum dynamics requirement corresponds to a maximum power change rate required during operation coming out of the idling mode, wherein the maximum dynamics requirement is determined from among a first maximum dynamics requirement and a second maximum dynamics requirement, wherein lower maximum power change rates are required for the first maximum dynamics requirement than for the second maximum dynamics requirement; and adapt operation of the fuel cell system of the motor vehicle during the idling based on the maximum dynamics requirement, such that: (a) when the maximum dynamics requirement is the first maximum dynamics requirement, the fuel cell system is adapted to operate in a first idling operation mode, and (b) when the maximum dynamics requirement is the second maximum dynamics requirement, the fuel cell system is adapted to operate in a second idling operation mode, wherein the fuel cell system is operated more efficiently in the first idling operating mode than in the second idling operation mode.

* * * * *